United States Patent
Massey

(10) Patent No.: US 9,950,334 B1
(45) Date of Patent: Apr. 24, 2018

(54) OVER SPRAY GUARD

(71) Applicant: Michael Massey, Carrollton, TX (US)

(72) Inventor: Michael Massey, Carrollton, TX (US)

( * ) Notice: Subject to any disclaimer, the term of this patent is extended or adjusted under 35 U.S.C. 154(b) by 0 days.

(21) Appl. No.: 14/520,346

(22) Filed: Oct. 22, 2014

(51) Int. Cl.
*B05B 1/28* (2006.01)
*B05B 15/04* (2006.01)

(52) U.S. Cl.
CPC .............................. *B05B 15/0437* (2013.01)

(58) Field of Classification Search
CPC ....................... B08B 2203/0229; B08B 3/028
USPC ......................................... 239/120, 124–126
See application file for complete search history.

(56) References Cited

U.S. PATENT DOCUMENTS

| | | | | |
|---|---|---|---|---|
| 2,928,610 A * | 3/1960 | Fenimore | ................... | B05B 1/28 239/288.5 |
| 3,460,764 A * | 8/1969 | Wallis | ....................... | B05B 5/03 118/629 |
| 3,672,380 A * | 6/1972 | Schuster | ................. | B08B 3/028 134/172 |
| 3,770,204 A * | 11/1973 | Schuster | ................... | B05B 1/28 134/172 |
| 5,170,943 A * | 12/1992 | Artzberger | ............ | E02F 3/9206 137/625.27 |
| 5,285,967 A * | 2/1994 | Weidman | ................ | B05B 7/205 239/132.1 |
| 5,419,077 A * | 5/1995 | Tombarelli | .......... | A01M 1/2038 239/121 |
| 5,489,234 A * | 2/1996 | Hockett | ............. | B23Q 11/0866 451/87 |
| 5,520,735 A * | 5/1996 | Mulder | ................... | B05B 5/032 118/308 |
| 5,640,739 A * | 6/1997 | Campbell | ............... | A47L 11/34 15/321 |
| 5,795,626 A * | 8/1998 | Gabel | ..................... | B05B 5/047 118/621 |
| 6,370,728 B1 * | 4/2002 | Burns | .................. | A47L 11/201 15/320 |
| 6,938,838 B2 | 9/2005 | Kawamoto | | |
| 7,334,742 B2 | 2/2008 | Jahnke et al. | | |
| 7,837,130 B1 | 11/2010 | Lowery | | |
| 2004/0149836 A1* | 8/2004 | Herhold | ................. | B08B 3/026 239/288 |

* cited by examiner

*Primary Examiner* — Arthur O Hall
*Assistant Examiner* — Adam J Rogers
(74) *Attorney, Agent, or Firm* — Law Office of Sam Sokhansanj PLLC

(57) ABSTRACT

An over spray gun assembly that prevents over spraying of atomized paint or vanish particles and droplets into the air and onto unwanted surfaces during a spraying operation, such as painting or staining a surface. More specifically, the over spray guard includes first shroud and a second shroud, wherein the second shroud is positioned within the first shroud thereby defining an open interior space for vacuuming unwanted or over sprayed airborne fluid droplets dispensed from a nozzle of the spray gun. In addition, an elongated sleeve or extension can be connected to the first shroud, thereby allowing a user to comfortably support, hold, position, and aim the over spray gun assembly.

11 Claims, 4 Drawing Sheets

OVER SPRAY GUARD

FIELD OF THE INVENTION

The present invention generally relates to a method and apparatus for preventing liquids such as paint, stain, or varnish from unwanted over spraying.

BACKGROUND OF INVENTION

Hand held and other spray systems, where a stream of fluid such as paint, stain, varnish or other fluids are atomized under pressure and then applied as a spray to a surface, suffers from some drawbacks. The first drawback is that the process of atomizing and spraying from the nozzle causes the fluid to be airborne and fall in areas other than the surface to which the fluid is to be applied, thereby causing unwanted surface areas to be splattered with droplets of paint. The second drawback is that the atomized fluid, once it is airborne, causes environmental and health concerns as it causes the air in the general vicinity to be suffused with the fluid particles.

Hence, what is needed is a device that can prevent, minimize, or eliminate the over spraying of paint, stain, or varnish from a pressurized spray system and that is easy to assemble, use, and manufacture.

BRIEF SUMMARY OF THE INVENTION

In one aspect of the present invention, a method, system, and apparatus are provided for a spray gun shroud or guard that prevents over spraying of atomized paint or vanish particles and droplets. In another aspect of the invention, a fluid spray guard apparatus is provided having a first shroud, a second shroud, and wherein the second shroud is positioned within the first shroud. In addition, one or more spacers can be positioned between the first shroud and second shroud. Further, an elongated sleeve can be connected to the first shroud, wherein the elongated sleeve can be further connected to a vacuum source.

In addition, the first and second shroud can define a space configured to receive fluid or liquid atomized droplets. The elongated sleeve can further enclose an extension tube coupled to a spray gun, and the elongated sleeve is can be further connected to a vacuum source or negative pressure source or air pump. The spray gun can be further connected to a fluid or liquid source. Here, the liquid source can be comprised of one or more of paint, stain, varnish, water, or any chemical substance. In addition, the second shroud can at least partially be supported by a nozzle assembly or nozzle head disposed within the second shroud. Here, the first shroud can pivot with respect to the second shroud. Further, the elongated sleeve can be connected to a joint body, and wherein the joint body is further connected to a suction tube, and wherein the suction tube is further connected to the vacuum source.

In another aspect of the present invention, a fluid spray apparatus is provided having a first cover, a second cover, wherein the distal end of the first cover extends beyond the distal end of the second cover. In addition, an elongated tube can be connected to the first cover, wherein the elongated tube can be further connected to a vacuum source.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The embodiments set forth below represent the necessary information to enable those skilled in the art to practice the invention and illustrate the best mode of practicing the invention. In addition, the invention does not require that all the advantageous features and all the advantages need to be incorporated into every embodiment of the invention.

Figure 1:
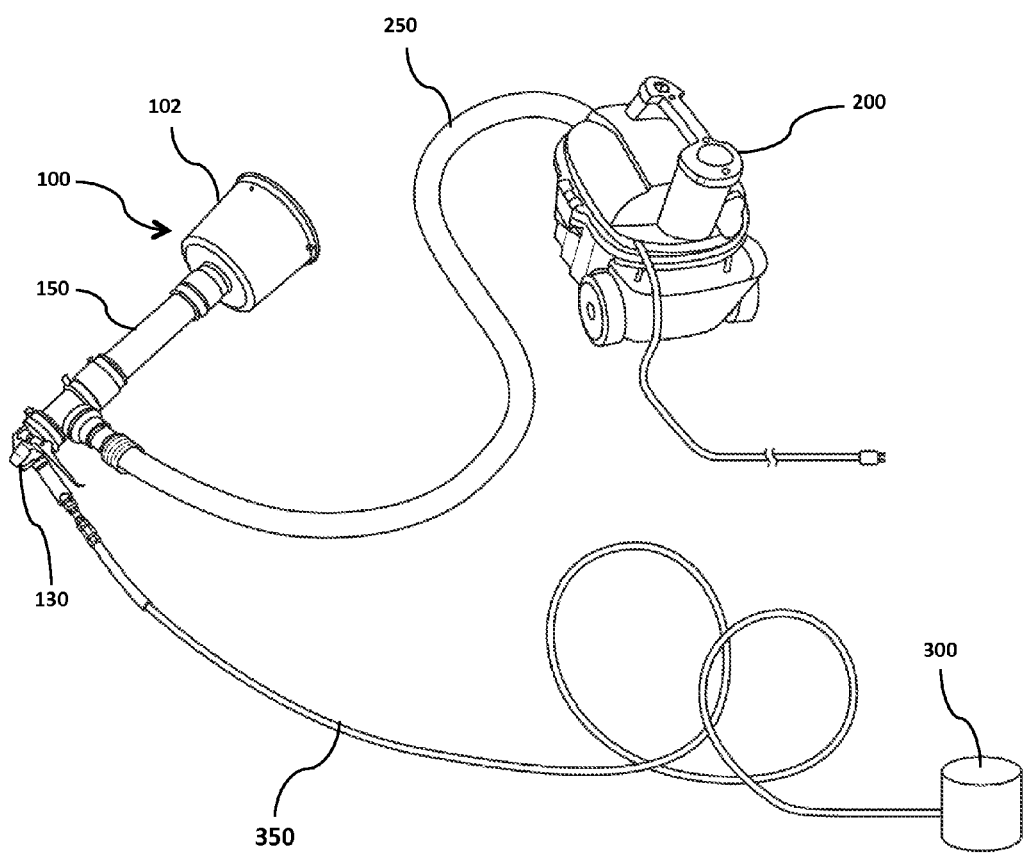
FIG. 1 illustrates a perspective view for a paint spray system and over spray guard according to one non-limiting embodiment of the present invention.
Figure 2:
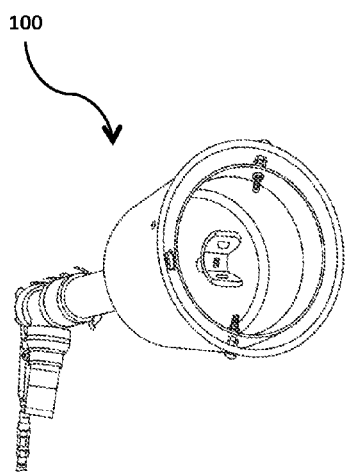
FIG. 2 illustrates a front perspective view for the overspray guard apparatus.
Figure 3:
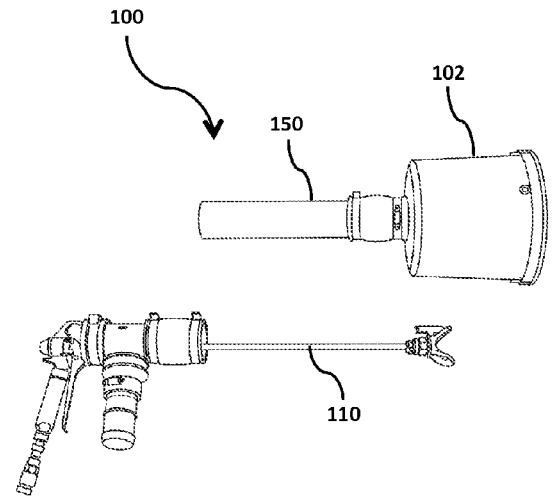
FIG. 3 illustrates a side perspective view of the overspray guard and arm extension removed from the spray gun and extended assembly.

FIG. 1 illustrates an overview for one non-limiting embodiment of an over spray guard assembly, spray gun, vacuum apparatus, and liquid source. Here, spray guard assembly 100 is generally comprised of a large shroud 102 encompassing a smaller shroud 104 (FIG. 4) and an extension arm or sleeve 150 that is connected to a vacuum or air suction source 200 and a spray gun, wherein the spray gun is further connected to a liquid source. Shrouds 102 and 104 can also be referred to herein as cones, guards, or covers. Here, the liquid source can include but is not limited to any type of paint, stain, varnish, paint remover, and the like. Operation of the spray guard assembly 100 will later be discussed in more detail. FIG. 2 illustrates a frontal perspective view for the spray guard assembly 100. FIG. 3 illustrates a side perspective view of components 150 and 102 as being removed and detached from the assembly, such as for cleaning purposes.

Figure 4:
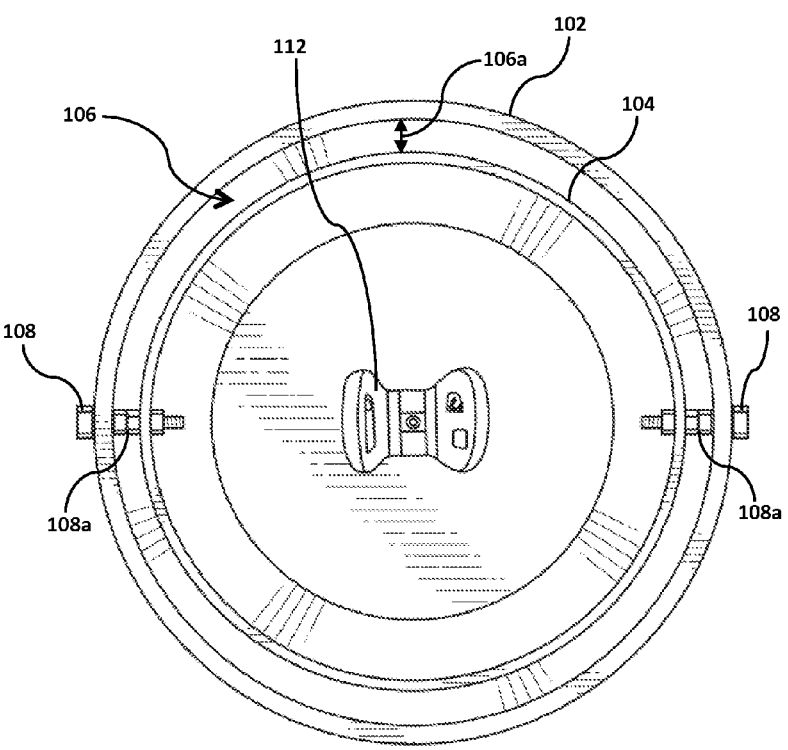
FIG. 4 illustrates a front and interior view of the overspray guard.

FIG. 4 illustrates a front and interior view of the spray gun shrouds of the spray guy assembly. More specifically, shroud 102 is shown encompassing and encircling shroud 104, wherein shroud 102 is larger in dimension than shroud 104, and wherein shroud 104 is entirely positioned within shroud 102. Shroud 104 is at least partially secured by nozzle and atomizer assembly 112 and securement members 108. More specifically, securement members 108 allow shroud 104 to slightly pivot with respect to shroud 102. Here, members 108 can further include spacers 108a that define the interior hollow space 106 for allowing over sprayed atomized liquid to be vacuumed within and through passage or space 106 and subsequently to the vacuum source. Here, spacing 106a can include but is not limited to 0.1 inches up to and including 2.0 inches, preferably approximately 0.5 inches. In addition, referring to FIG. 6, the spacing from distal end 104a of shroud 104 to distal end 102a of shroud 102 can include but is not limited to 0.1 inches up to and including 3.0 inches, preferably 0.5 inches. Referring back to FIG. 4, members 108 and spacers 108a can include but are not limited to rods, dividers, nuts, bolts, screws, rivets, fixed members, telescoping parts, and the like, and can be secured to or fastened to one or both of shrouds 102 and 104 via nuts, bolts, fusing, screws, and/or one or more adhesives. It is contemplated within the scope of the invention that shrouds 102 and 104 can include any number of securement members, either fixed or pivoting, and any number of spacers along the interior space 106.

Figure 5:
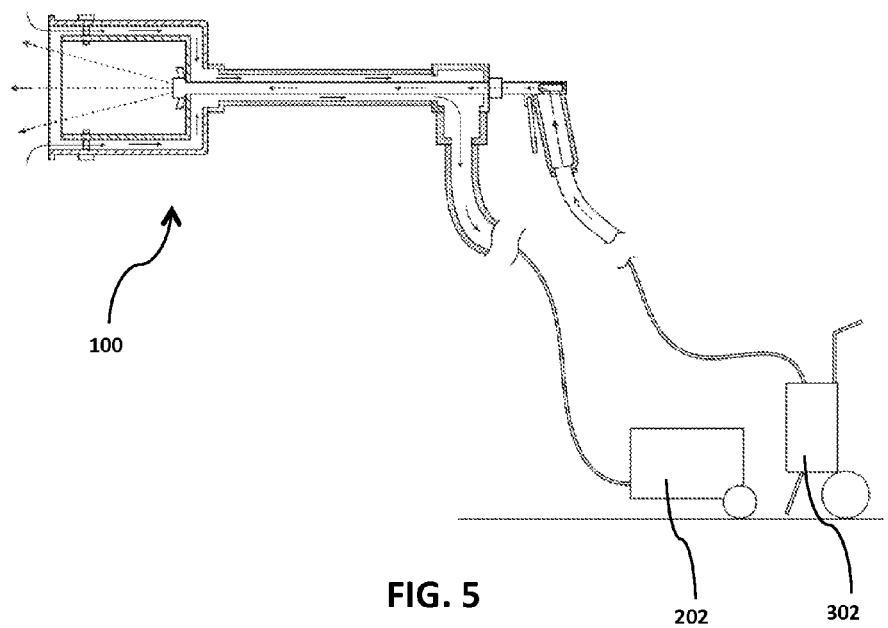
FIG. 5 illustrates a cross-sectional side view of the overspray guard assembly.
Figure 7:
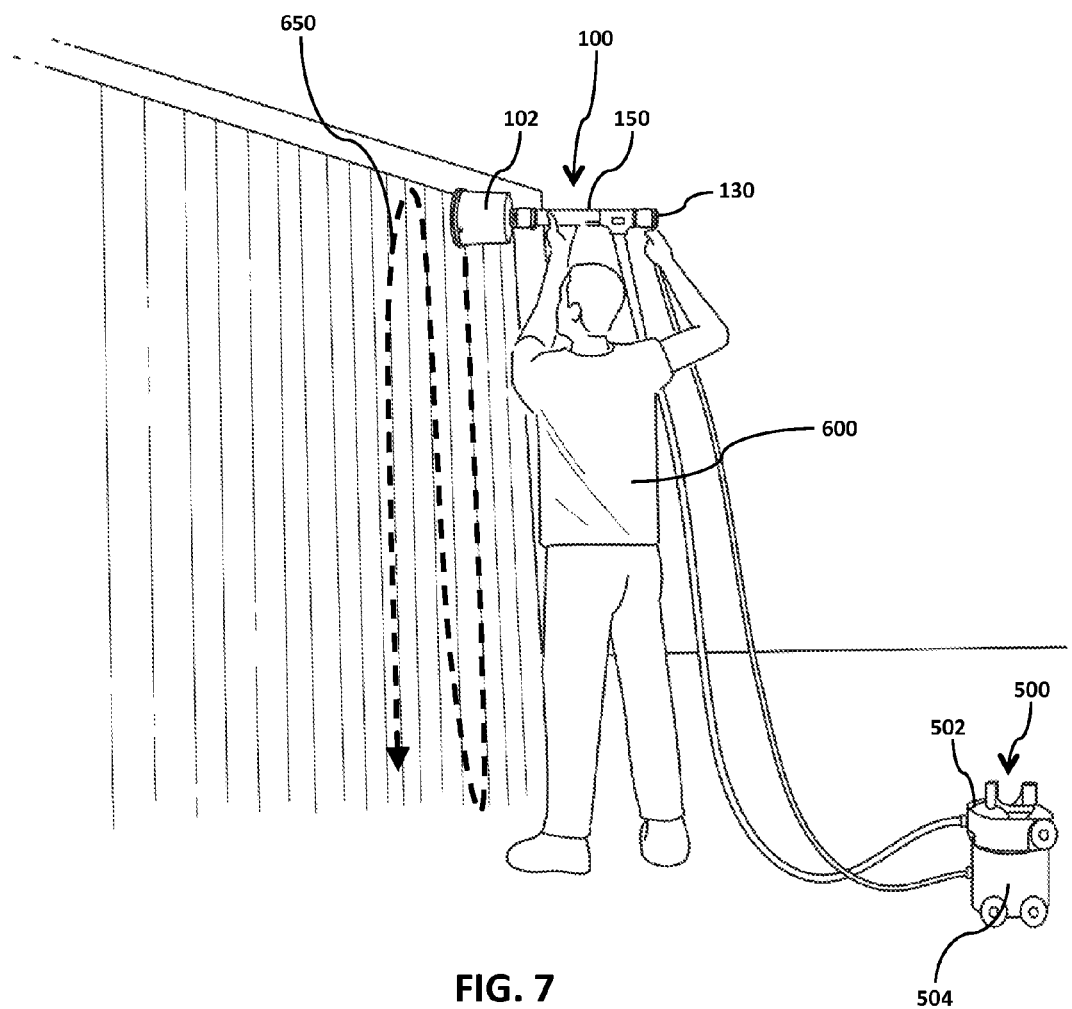
FIG. 7 illustrates a perspective view of a user using the overspray guard and spray gun assembly according to one non-limiting embodiment of the present invention.

FIG. 5 illustrates a cross-sectional view of the spray gun and over spray guard assembly of the present invention as being coupled to a mobile liquid source 302 and vacuum source 202. It is contemplated within the scope of the invention that either of sources 302 or 202 can be integrated as one component, such as shown in FIG. 7 (source 500). Further, vacuum sources 300, 302, or 502 can include any type of Shop-Vac®, air suction device, or air pump. Here, vacuum sources 300, 302, or 502 can be of any power and size, such as from 0.5 HP (horsepower) up to and including 20.0 HP, preferably 1.5 HP, and from 1 gallon up to and including 20 gallons. Liquid sources 200, 202, or 504 can also include any type of liquid, water, paint, stain, varnish, paint remover, disinfectant, cleaning solution, and/or chemical substance.

Figure 6:
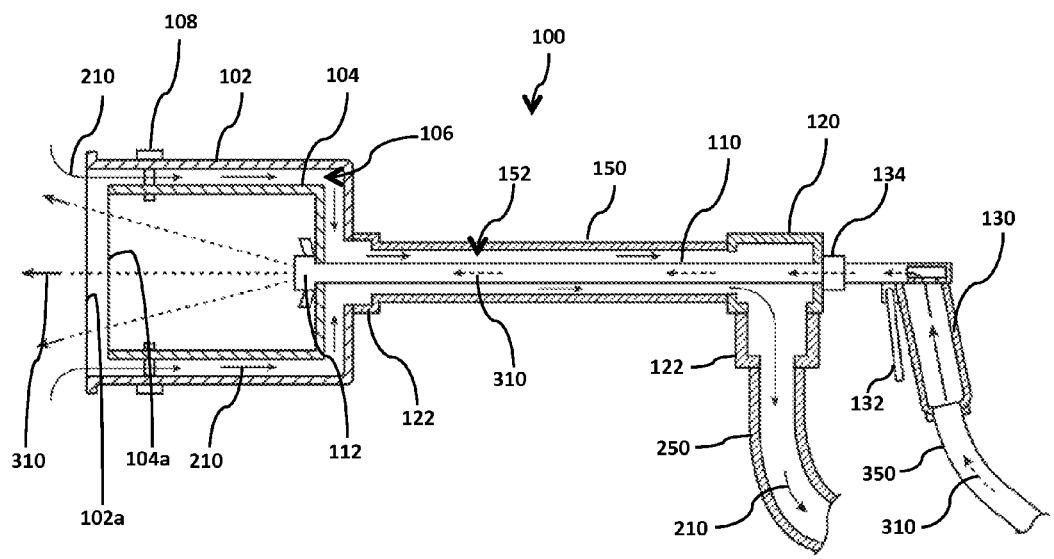
FIG. 6 illustrates a close-up of the cross-section view of the overspray guard assembly of FIG. 5.

FIG. 6 illustrates a cross-sectional close-up view of one embodiment of the over spray guard assembly 100 of the present invention. Here, spray gun 130 is shown secured and fastened at its distal end outlet 134 to extension tubular body 110. Tubular body 110 is further connected to nozzle and atomizer head 112. Here, a joint body 120 is secured to the distal end 134 of spray gun 130 and the proximal end of tube 110. The joint 120 is further secured and connected to extension sleeve 150. The lower end of joint 120 is secured to another receiving body 122 that fluidly connects and secures vacuum tube 250 to the spray gun assembly 100. It is contemplated within the scope of the invention that tube 250 can also directly connect to either of extension 150 and/or joint 120. The distal end of tube 110 is further connected to and secured to another joint body 122 that further connects and is secured to shroud 102. It is contemplated within the scope of the invention that any type of spray gun may be used with assembly 100, including but not limited to air sprayers, airless sprayers, and high-volume low-pressure (HVLP) sprayers. In addition, extension 150 can also be sized and configured to allow for a greater vacuum pressure, such as minimizing the open air space or passage between rod 110 and extension 150, or vice versa.

Still referring to FIG. 6, a method of operation for one embodiment of the over spray guard assembly will now be described. It is contemplated within the scope of the invention that the following method can be carried out in any order and may include additional steps and/or any one or more of the following steps may be omitted. Here, vacuum source 300 can be actuated and start providing air suction pressure 210 through tube 250. At this time, a user can place the distal end 102a of the spray gun assembly against a surface, such as a wall or wooded fence (see FIG. 7), and actuate the spray gun 130 using lever 132. Once spray gun 130 is actuated, a pressurized liquid 310 (such as paint, stain, or varnish) will travel through tube 310 and gun 130 and through extension tube 110 and subsequently be dispensed at the nozzle and atomizer 112 and on to the surface where the liquid is being applied thereto (see FIG. 7). Here, as liquid 310 is being dispensed out of nozzle 112 and shroud 104, the over spay droplets can be captured by the suction or vacuum force 210 around the ends of shrouds 104 and 102. The over spray atomized particles or droplets are generally captured on the periphery of the spray zone by suction force 210, thereby preventing unwanted atomized liquid particles from being dispersed in the air. Here, the captured liquid particles, collectively also shown as reference 210, enter and travel along and through the interior space 106, through space 152 within sleeve 150, through the suction tube 250, and subsequently into the suction source 200, 202, or 502.

FIG. 7 illustrates the over spray guard assembly of the present invention being used on a wooden fence. In addition, the over spray guard assembly 100 is shown having another embodiment of a stacked or combined vacuum source 502 and liquid source 504, collectively as source 500. Here, in one embodiment of operation, a user 600 can hold the extension tube body 150 with one hand and the spray gun 130 with another hand. This holding configuration allows the user to properly position and operate assembly 100. In addition, the extension body 150 allows for the user to comfortably hold, distribute, and support the weight of assembly 100. In one embodiment of operation, user 600 can place the end of the assembly 100 against the fence and at least partially firmly press against the fence with the distal end of shroud 102, creating a partial seal with the surface of the fence. At this stage, the vacuum source 502 can be actuated or powered on and the liquid source 504 and spray gun actuated. Here, the liquid source 504 can be a wood staining substance. The user 600 can begin by either starting from the top or bottom of the fence and moving in an up/down or vertical pattern 600 until the fence is covered with the wood staining substance. However, it is contemplated within the scope of the invention that the painting or staining pattern can be in any desired direction, such as horizontally or sections. In further embodiments, the captured atomized droplets can also be directed back to the liquid source and/or re-used for future applications. In addition, while shroud 102 is pressed against the surface, the assembly allows for some pivoting with respect to the surface via the pivot points 108 while still keeping shroud 102 in contact, or at least partially sealed, with the surface being painted on.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A fluid spray guard apparatus comprising:
   a first shroud;
   a second shroud, wherein the second shroud is disposed within the first shroud;
   one or more spacers disposed between the first shroud and second shroud, wherein the one or more spacers define a space between the first shroud and the second shroud;
   the first shroud configured to pivot with respect to the second shroud via the one or more spacers; and
   an elongated sleeve coupled to the first shroud wherein a length of the elongated sleeve is longer than a length of the first shroud or the second shroud, wherein the sleeve at least partially encloses an elongated tubular body, and wherein an interior of the elongated sleeve is in fluid communication with the space between the first shroud and the second shroud.

2. The fluid spray guard apparatus of claim 1, wherein the space between the first shroud and second shroud is configured to receive fluid droplets therein.

3. The fluid spray guard apparatus of claim 1, wherein the elongated tubular body is further coupled to a fluid dispensing source.

4. The fluid spray guard apparatus of claim 3, wherein one end of the elongated sleeve is coupled to one end of the first shroud.

5. The fluid spray guard apparatus of claim 3, wherein the fluid dispensing source is comprised of a triggered spray gun.

6. The fluid spray guard apparatus of claim 5, wherein the fluid dispensing source is comprised of a liquid further comprised of at least one of: paint, stain, varnish, water, or a chemical substance.

7. The fluid spray guard apparatus of claim 1, wherein the second shroud is at least partially supported by a nozzle disposed within the second shroud.

8. The fluid spray guard apparatus of claim 1, wherein one end of the elongated sleeve is further configured to couple to a fluid source.

9. The fluid spray guard apparatus of claim 1, wherein the elongated sleeve is further coupled to a joint body, and wherein the joint body is further coupled to a suction tube further coupled to a vacuum or suction source.

10. A fluid spray guard apparatus comprised of:
    a first cover;
    a second cover, wherein the distal end of the first cover extends beyond the distal end of the second cover;
    one or more spacers disposed between the first shroud and second shroud, wherein the one or more spacers define a first space between the first shroud and the second shroud;
    the first cover adapted to be pivotable relative to the second cover; and
    a first elongated tube coupled to the first cover, wherein a length of the first elongated tube is longer than a length of the first cover or the second cover, wherein the first elongated tube at least partially encloses a second elongated tube, wherein the first and second elongated tube define a second space between them, and wherein the second space is in fluid communication with the first space.

11. A fluid spray guard apparatus comprised of:
    a first shroud;
    a second shroud, wherein the second shroud is disposed within the first shroud;
    one or more securement members disposed between the first shroud and the second shroud, wherein the one or more securement members define a space between the first shroud and the second shroud and are further configured to operate as a pivot point;
    the second shroud pivotable relative to the first shroud via the pivot point of the securement members; and
    an elongated tube, wherein the elongated tube at least partially encloses a fluid dispensing tube, and wherein an interior space of the elongated tube is in fluid communication with the space between the first shroud and the second shroud.

* * * * *